(12) United States Patent
Hiller et al.

(10) Patent No.: US 9,741,476 B2
(45) Date of Patent: Aug. 22, 2017

(54) COVERS FOR DISTRIBUTION LINES AND INSULATORS

(71) Applicant: Tyco Electronics Corporation, Berwyn, PA (US)

(72) Inventors: Laura Hiller, Cary, NC (US); David Bowling, Fuquay-Varina, NC (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 320 days.

(21) Appl. No.: 14/618,624

(22) Filed: Feb. 10, 2015

(65) Prior Publication Data

US 2016/0233010 A1    Aug. 11, 2016

(51) Int. Cl.
| | | |
|---|---|---|
| H01B 19/00 | (2006.01) | |
| H01B 17/00 | (2006.01) | |
| H02G 7/00  | (2006.01) | |
| H02G 1/02  | (2006.01) | |

(52) U.S. Cl.
CPC ............ *H01B 19/00* (2013.01); *H01B 17/00* (2013.01); *H02G 1/02* (2013.01); *H02G 7/00* (2013.01)

(58) Field of Classification Search
CPC combination set(s) only.
See application file for complete search history.

(56) References Cited

U.S. PATENT DOCUMENTS

| | | |
|---|---|---|
| 881,682 A | 3/1908 | Harrison et al. |
| 983,039 A | 1/1911 | Field |
| 992,738 A | 5/1911 | Marshall |
| 1,141,674 A | 6/1915 | Withers |
| 1,180,729 A | 7/1916 | Marshall |
| 1,766,636 A | 6/1930 | Holzel |
| 2,234,391 A | 3/1941 | Taylor |
| 2,263,319 A | 11/1941 | Treanor |
| 2,617,378 A | 11/1952 | Osol |

(Continued)

FOREIGN PATENT DOCUMENTS

| | | |
|---|---|---|
| DE | 8523201 U1 | 10/1985 |
| DE | 8914320 U1 | 3/1990 |

(Continued)

OTHER PUBLICATIONS

"Raptor Cover BCIC Wildlife and Asset Protection Products", TE Connectivity Ltd., © 2011, 2012, 2014, 2 pages.

(Continued)

*Primary Examiner* — Dhirubhai R Patel
(74) *Attorney, Agent, or Firm* — Myers Bigel, P.A.

(57) ABSTRACT

A protective cover assembly for an electrical power distribution line conductor mounted on a horizontally oriented post insulator includes an insulator cover and a retaining pin. The insulator cover includes a cover body defining an insulator cavity configured to receive the insulator and a mounting bracket integral with the cover body. The mounting bracket defines a bracket slot having a bottom entry opening configured to receive the horizontally oriented insulator to couple the cover body to the insulator. The retaining pin is configured to close off the bottom entry opening to secure the insulator cover to the insulator. The cover body is formed of a flexible first material and the mounting bracket is formed of a second material that is more rigid than the first material.

21 Claims, 11 Drawing Sheets

(56) References Cited

U.S. PATENT DOCUMENTS

| | | |
|---|---|---|
| 2,682,591 A | 6/1954 | Killian |
| 2,840,631 A | 6/1958 | Marcroft |
| 2,875,267 A | 2/1959 | Sutton, Jr. |
| 2,999,479 A | 9/1961 | Carder |
| 3,005,436 A | 10/1961 | Caldwell |
| 3,016,034 A | 1/1962 | Raistakka |
| 3,042,736 A | 7/1962 | SaliSbury |
| 3,056,376 A | 10/1962 | Bender |
| 3,079,457 A | 2/1963 | Newcomb, Jr. |
| 3,238,291 A | 3/1966 | Bosch |
| 3,270,120 A | 8/1966 | Van Name et al. |
| 3,328,511 A | 6/1967 | Cagle |
| 3,510,568 A | 5/1970 | Cochran |
| 3,639,681 A | 2/1972 | Ettlinger |
| 3,692,927 A | 9/1972 | Ellaschuk |
| 3,835,238 A | 9/1974 | West |
| 3,900,698 A | 8/1975 | Yotsugi |
| 4,053,707 A | 10/1977 | Ely et al. |
| 4,201,883 A | 5/1980 | Shepherd |
| 4,234,753 A | 11/1980 | Clutter |
| 4,243,628 A | 1/1981 | Herold |
| 4,255,610 A | 3/1981 | Textoris |
| 4,280,013 A | 7/1981 | Clutter |
| 4,433,630 A | 2/1984 | Laborie |
| 4,467,387 A | 8/1984 | Bergh et al. |
| 4,628,145 A | 12/1986 | Kolcio et al. |
| 4,731,507 A | 3/1988 | Torimoto et al. |
| 4,845,307 A | 7/1989 | Cumming et al. |
| 4,906,801 A | 3/1990 | Beasley |
| 5,023,406 A | 6/1991 | Thornley |
| 5,293,835 A | 3/1994 | Shagoury |
| 5,650,594 A | 7/1997 | Urnovitz |
| 5,682,015 A | 10/1997 | Harben |
| 5,794,495 A | 8/1998 | Anderson |
| 5,864,696 A | 1/1999 | Williams et al. |
| 5,873,324 A | 2/1999 | Kaddas et al. |
| 5,994,644 A | 11/1999 | Rindoks et al. |
| 6,005,196 A | 12/1999 | Spillyards |
| 6,255,597 B1 | 7/2001 | Bowling et al. |
| 6,730,852 B1 | 5/2004 | Puigcerver et al. |
| 6,812,400 B1 | 11/2004 | Lynch |
| 7,154,034 B2 | 12/2006 | Lynch |
| 7,154,036 B2 | 12/2006 | Lynch |
| 7,297,869 B2 * | 11/2007 | Hiller ............... H01B 17/00 119/174 |
| 8,067,691 B2 | 11/2011 | Puigcerver et al. |
| 8,156,693 B2 | 4/2012 | Lynch |
| 8,225,558 B2 | 7/2012 | Lynch |
| 8,618,412 B2 | 12/2013 | Lynch |
| 2012/0279778 A1 | 11/2012 | Lynch |
| 2013/0264097 A1 | 10/2013 | Lynch |
| 2014/0034380 A1 | 2/2014 | Lynch |
| 2014/0262435 A1 | 9/2014 | Miller et al. |
| 2014/0262485 A1 | 9/2014 | Miller et al. |
| 2016/0111863 A1 * | 4/2016 | Williams ............ H02G 7/00 174/40 R |

FOREIGN PATENT DOCUMENTS

| | | |
|---|---|---|
| DE | 4115866 A1 | 11/1992 |
| DE | 9414366 U1 | 10/1994 |
| DE | 29815864 U1 | 11/1998 |
| TW | 501815 U | 9/2002 |

OTHER PUBLICATIONS

"The BirdguarD™ Line of Wildlife Outage Protection Products", Kaddas Enterprises Inc. ®, © Kaddas Enterprises Inc. 2012, 27 pages.

* cited by examiner

COVERS FOR DISTRIBUTION LINES AND INSULATORS

RELATED APPLICATION(S)

N/A.

FIELD OF THE INVENTION

The present invention relates to protective covers and, more particularly, to protective covers for distribution lines and insulators, such as power distribution lines and associated insulators.

BACKGROUND OF THE INVENTION

Support structures, such as utility poles, are often used to suspend electrical lines, such as power distribution lines, above the ground. These support structures are generally located outdoors and may be of a variety of different configurations to suspend one or more lines. One problem with such lines, particularly with power distribution lines that transmit electrical power at high voltages, is that birds or other animals may land or climb onto the lines. Such contact of distribution lines by animals, particularly adjacent the support structure, may cause a short or electrical flashover allowing current flow through the animal, which may cause a power outage or other problem with the power distribution system.

For example, it is known that birds from time to time perch on support structures such as utility poles. For certain birds, their wing span is great enough to contact two parallel lines or otherwise create an electrical flashover during takeoff or landing. In addition to harming the bird, such an electrical flashover can also cause a power outage or other problem with the power distribution system.

SUMMARY OF THE INVENTION

According to embodiments of the invention, a protective cover assembly for an electrical power distribution line conductor mounted on a horizontally oriented post insulator includes an insulator cover and a retaining pin. The insulator cover includes a cover body defining an insulator cavity configured to receive the insulator and a mounting bracket integral with the cover body. The mounting bracket defines a bracket slot having a bottom entry opening configured to receive the horizontally oriented insulator to couple the cover body to the insulator. The retaining pin is configured to close off the bottom entry opening to secure the insulator cover to the insulator. The cover body is formed of a flexible first material and the mounting bracket is formed of a second material that is more rigid than the first material.

According to method embodiments of the invention, a method for forming an environmentally protected insulator assembly including an electrical power distribution line conductor mounted on a horizontally oriented post insulator, includes providing an insulator cover including: a cover body defining an insulator cavity configured to receive the insulator; and a mounting bracket integral with the cover body, the mounting bracket defining a bracket slot having a bottom entry opening configured to receive the horizontally oriented insulator to couple the cover body to the insulator. The method further includes: mounting the insulator cover on the conductor and the horizontally oriented insulator such that the insulator is received in the insulator cavity and into the bracket slot through the bottom entry opening; and installing a retaining pin in the mounting bracket to close off the bottom entry opening to secure the insulator cover to the insulator. The cover body is formed of a flexible first material and the mounting bracket is formed of a second material that is more rigid than the first material.

According to embodiments of the invention, an environmentally protected insulator assembly includes a horizontally oriented post insulator, an electrical power distribution line conductor mounted on the horizontally-oriented post insulator, an insulator cover and a retaining pin. The insulator cover includes: a cover body defining an insulator cavity configured to receive the insulator; and a mounting bracket integral with the cover body, the mounting bracket defining a bracket slot having a bottom entry opening configured to receive the horizontally oriented insulator. The insulator cover is mounted on the conductor and the horizontally oriented insulator such that the insulator is received in the insulator cavity and the bracket slot. The retaining pin is installed in the mounting bracket to close off the bottom entry opening to secure the insulator cover to the insulator. The cover body is formed of a flexible first material and the mounting bracket is formed of a second material that is more rigid than the first material.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The term "monolithic" means an object that is a single, unitary piece formed or composed of a material without joints or seams.

Figure 1:
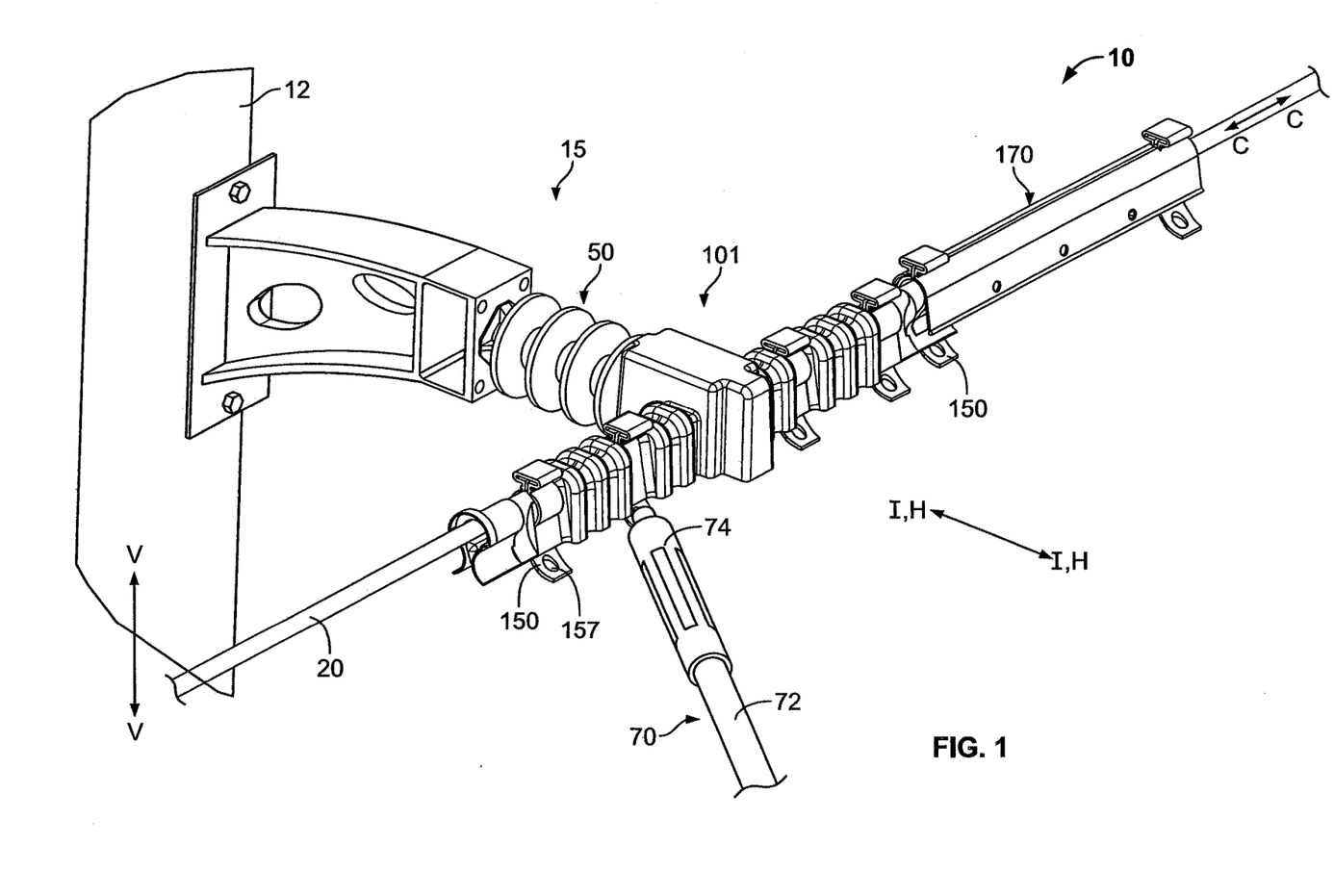
FIG. 1 is a perspective view of an electrical power distribution system including a protective cover assembly according to embodiments of the invention.

With reference to FIGS. 1-12, a protective cover assembly 101 according to embodiments of the invention is shown mounted on an electrical power distribution system to form an environmentally protected insulator assembly 15. The power distribution system 10 includes a support (e.g., a utility pole) 12 and a horizontally-oriented post insulator 50 mounted on the support 12. An electrical conductor 20 extends across and is mechanically secured to the insulator 50. Either end of the conductor 20 may extend to and electrically connect further components of the system 10. The conductor 20 may be operatively mechanically connected to the insulator 50 in any suitable manner, such mounting methods being well-known to those of skill in the art. One or more extension covers 170 may be combined with the cover assembly 101 to form a protective cover system 10 as shown in FIG. 1.

As best seen in FIGS. 2-5, the insulator 50 is a horizontal post insulator having an insulator longitudinal axis I-I. The longitudinal axis I-I extends transversely to absolute vertical V-V, where absolute horizontal and absolute vertical are defined by gravity. In some embodiments, the longitudinal axis I-I forms an angle less than 20 degrees with absolute horizontal H-H, and in some embodiments the longitudinal axis I-I extends substantially horizontally (i.e., substantially parallel to absolute horizontal H-H).

The insulator 50 includes an insulator body 52 having alternating core segments 54 and annular skirts 56 that extend radially outwardly from the core segments 54. The core segments 54 and skirt segments extend serially along the longitudinal axis I-I. The body 52 extends from a proximal end 52A to a free distal end 52B. The body 52 is secured to the support 12 at its proximal end 52A and is thereby cantilevered from the support 12. The insulator body 52 may be formed of a polymer or a ceramic, for example.

A conductor mount bracket 58 is mounted on the distal end of the insulator body 52. The conductor 20 extends through a lateral passage or seat 58A defined in the bracket 58. As shown, the conductor 20 is a continuous elongate member or segment extending through or over the insulator 50 (and, when installed, the cover 100). Alternatively, the ends of two or more conductors may be connected to the insulator 50 or the conductor may extend from only one side.

The conductor 20 is mounted in the seat 58A and has a conductor longitudinal axis C-C. The conductor longitudinal axis C-C extends transversely to absolute vertical V-V and transversely to the insulator longitudinal axis I-I. In some embodiments, the conductor longitudinal axis C-C extends substantially perpendicularly to the insulator longitudinal axis I-I. In some embodiments, the conductor longitudinal axis C-C extends substantially perpendicularly to vertical V-V.

The protective cover assembly 101 includes an insulator cover 100 and a retaining pin 140. The insulator cover 100 includes a cover body 110, a mounting bracket 130, fasteners 139, and a plurality (as shown, four) connector members or clips 150.

With reference to FIGS. 5-9, the cover body 110 has a longitudinal axis L-L. The cover body 110 includes a central or main body or shroud section 112 and a pair of opposed, laterally extending, generally inverted U-shaped body extensions or legs 120. Generally, the main body section 110 provides coverage for the electrically conductive components of the insulator 50 and the overlying portion of the conductor 20, and the legs 120 provide coverage for more extant opposed portions of the conductor 20. The insulator cover 100 is adapted to receive the insulator 50 and portions of the conductor 20 such that at least a portion of the conductor 20 generally extends along a lengthwise conductor axis C-C.

The main body section 112 defines a central insulator cavity 114A to receive the insulator 50, a bottom opening 114B communicating and contiguous with the cavity 114A, and a rear end slot 114C communicating and contiguous with the cavity 114A and the bottom opening 114B. The main body section 112 further includes a front end wall 116 opposite the rear end slot 114C, and a top wall 115 opposite the bottom opening 114B.

The legs 120 each define a leg channel 122A to receive the conductor 20. An elongate bottom opening 122B communicates and is contiguous with each leg channel 122A. Each channel 122A and its bottom opening 122B terminate at the insulator cavity 114A and the main body bottom opening 114B at one end, and at a distal end opening 122C at the other end. Each leg 120 includes a laterally inward extending coupling recess 124. Each leg 120 includes flexible, corrugated joint sections 126 to enable repositioning of the legs 120 relative to the insulator 50 for different line approach angles to the insulator beyond the flexibility and range provided by the use of the flexible material for the main body section 112.

Figure 10:
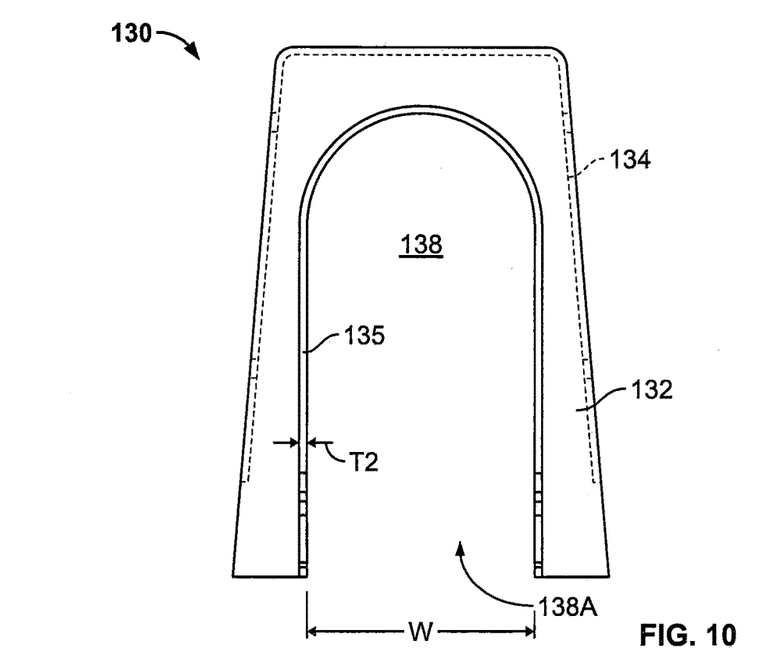
FIG. 10 is a rear view of a mounting bracket forming a part of the protective cover assembly of FIG. 1.
Figure 11:
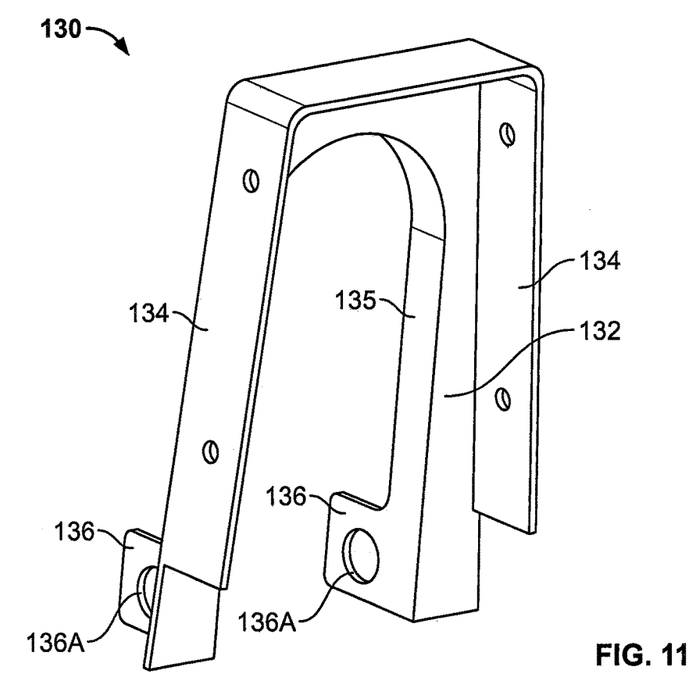
FIG. 11 is a rear perspective view of the mounting bracket of FIG. 10.

As shown in FIGS. 10 and 11, the mounting bracket 130 includes a generally inverted body 132. An integral anchor tab or flange 134 projects forwardly from the body 132. An integral, inverted U-shaped rear flange 135 projects rearwardly from the body 132 and includes a pair of axially spaced-apart lock tabs 136 on its lower ends. Aligned holes 136A are provided in the lock tabs 136. The body 132 and flange 135 define an inverted U-shaped opening or slot 138 contiguous and in communication with the insulator cavity 114A. The slot 138 has a lower entry opening 138A. The mounting bracket 130 is affixed to the cover body 110 in the rear end slot 114C by fasteners 139 (e.g., rivets) that extend through the main section 112 and the anchor flange 134.

Figure 12:
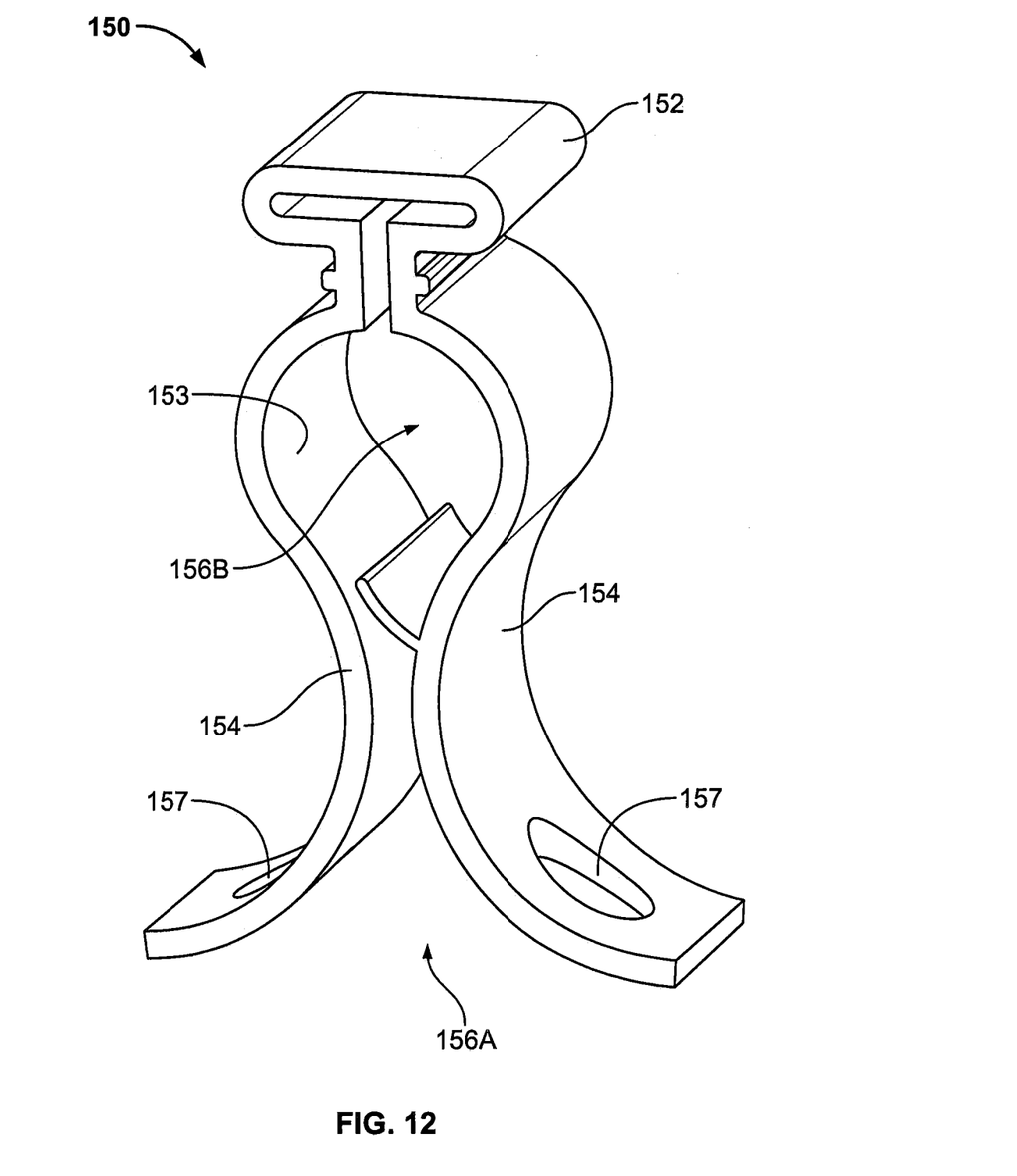
FIG. 12 is a perspective view of a conductor clip forming a part of the protective cover assembly of FIG. 1.

As shown in FIG. 12, the connector members 150 are displacement spring clip type connectors. More particularly, the connector members 150 are omega clip type connectors. However, other types of connectors may be used in various embodiments of the present invention including mechanical clamps, swing clamps, ratcheting clamps, and the like. Furthermore, while the illustrated embodiments include four connector members 150, more or fewer connector members may be provided.

The omega clip 150, as shown in FIG. 12, includes an upper spring portion 152, a conductor holding portion 153, and opposed clip arms 154 extending from the conductor holding portion 153. The arms 154 flare or curve laterally outwardly from one another to define a receiving slot 156A therebetween. In some embodiments, the slot 156A is closed at its top end by abutment between the arms 154. A conductor receiving passage 156B extends axially through the portion 153. Handling holes 157 are provided in the ends of the arms 154. Each clip 150 is disposed in the associated leg channel 122A and secured in place by coupling between the spring portion 152 and the cover body 110. In some embodiments, the cover body 110 is vacuum formed or otherwise molded about the portions 152.

The retaining pin 140 (FIG. 7) includes a shaft 142 provided with a retention feature 144 (e.g., a barbed head, as shown) at one end and a handling feature 146 (e.g., a handle loop, as shown) at its opposite end.

The insulator cover 100 may be formed of any suitable electrically insulating material(s). According to some embodiments, the cover body 110 is formed of a different material than the mounting bracket 130 and the clips 150. According to some embodiments, the clips 150 are formed of a more rigid material than the cover body 110. According to some embodiments, the mounting bracket 130 is formed of a more rigid material than the cover body 110.

According to some embodiments, the cover body 110 is formed of a flexible polymeric material. According to some embodiments, the cover body 110 is formed of a flexible polymeric material selected from the group consisting of polyolefins. According to some embodiments, the cover body 110 is formed of a track resistant, insulating grade, UV stable polymer. According to some embodiments, the cover body 110 is formed of a material having a secant modulus in the range of from about 10,000 to 25,000 psi. According to some embodiments, the material of the cover body 110 has a tensile strength in the range of from about 1450 to 2500 psi. According to some embodiments, the cover body 110 is unitarily and integrally formed. According to some embodiments, the cover body 110 is unitarily molded. According to some embodiments, the cover body 110 is unitarily injection molded. In some embodiments, cover body 110 is vacuum formed. According to some embodiments, the cover body 110 is monolithic.

According to some embodiments, the clips 150 are formed of a rigid or semi-rigid polymeric material. According to some embodiments, the clips 150 are formed of a rigid or semi-rigid polymeric material selected from the group consisting of polyolefins and polyolefin copolymers. According to some embodiments, the clips 150 are formed of a material having a secant modulus in the range of from about 29,000 to 120,000 psi. According to some embodiments, the material of the clips 150 has a tensile strength in the range of from about 2450 to 3500 psi. According to some embodiments, each clip 150 is unitarily molded. According to some embodiments, each clip 150 is unitarily injection molded. According to some embodiments, each clip 150 is monolithic.

According to some embodiments, the mounting bracket 130 is formed of a rigid or semi-rigid polymeric material. According to some embodiments, the bracket 130 is formed of a rigid or semi-rigid polymeric material selected from the group consisting of polyolefins and polyolefin copolymers. According to some embodiments, the bracket 130 is formed of a material having a secant modulus in the range of from about 29,000 to 120,000 psi. According to some embodiments, the material of the bracket 130 has a tensile strength in the range of from about 2450 to 3500 psi. According to some embodiments, the bracket 130 is unitarily molded. According to some embodiments, the bracket 130 is unitarily injection molded. According to some embodiments, the bracket 130 is monolithic.

According to some embodiments, the retaining pin 140 is formed of a rigid or semi-rigid polymeric material. According to some embodiments, the retaining pin 140 is formed of a rigid or semi-rigid polymeric material selected from the group consisting of polyolefins and polyolefin copolymers. According to some embodiments, the retaining pin 140 is formed of a material having a secant modulus in the range of from about 29,000 to 120,000 psi. According to some embodiments, the material of the retaining pin 140 has a tensile strength in the range of from about 2450 to 3500 psi. According to some embodiments, the retaining pin 140 is unitarily molded. According to some embodiments, the retaining pin 140 is unitarily injection molded. According to some embodiments, retaining pin 140 is monolithic.

According to some embodiments, the cover body 110 has a thickness T1 (FIG. 5) in the range of from about 0.09 inch to 0.125 inch. In some embodiments, the thickness of the cover body 110 is substantially uniform and varies by no more than about 15%.

According to some embodiments, the bracket 130 has a thickness T2 (FIG. 10) in the range of from about 0.09 inch to 0.25 inch. In some embodiments, the thickness of the bracket 130 is substantially uniform and varies by no more than about 15%.

According to some embodiments, the cover body 110 and the clips 150 are formed of a polymeric material that remains resilient down to a temperature of at least −40 degrees Celsius.

The protective cover assembly 101 and the cover system 10 may be mounted on the insulator 50 and the conductor 20 in the following manner. According to some embodiments and as discussed below, the cover 100 can be installed on a "hot" or powered line using a hot stick 70 (FIG. 1) or other installation tool. The exemplary hot stick includes an electrically insulating handle 72 and an engagement or grabbing device 74 on the affixed to an end of the handle 72. Suitable hot sticks may include, for example, a Telescoping or Shotgun type hot stick available from Hastings, AB Chance or Salisbury. Alternatively, the insulator cover 100 can be installed on a "hot" or powered line using gloves or the like. The handling holes 157 of the clips 150 can be gripped by the hotstick 70 or other tool to install, remove or otherwise manipulate the cover 100.

Figure 2:
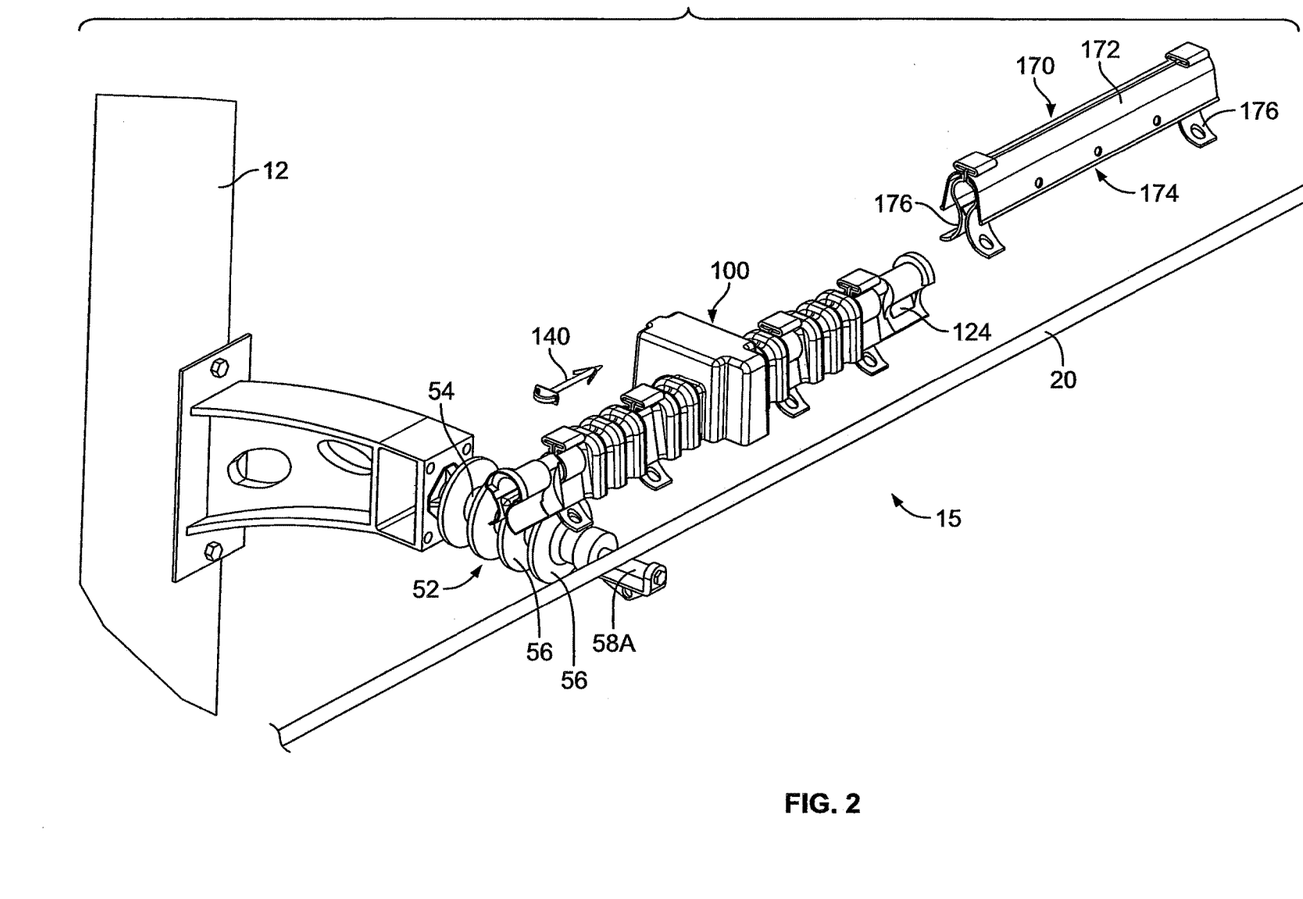
FIG. 2 is an exploded, perspective view of the electrical power distribution system of FIG. 1.
Figure 3:
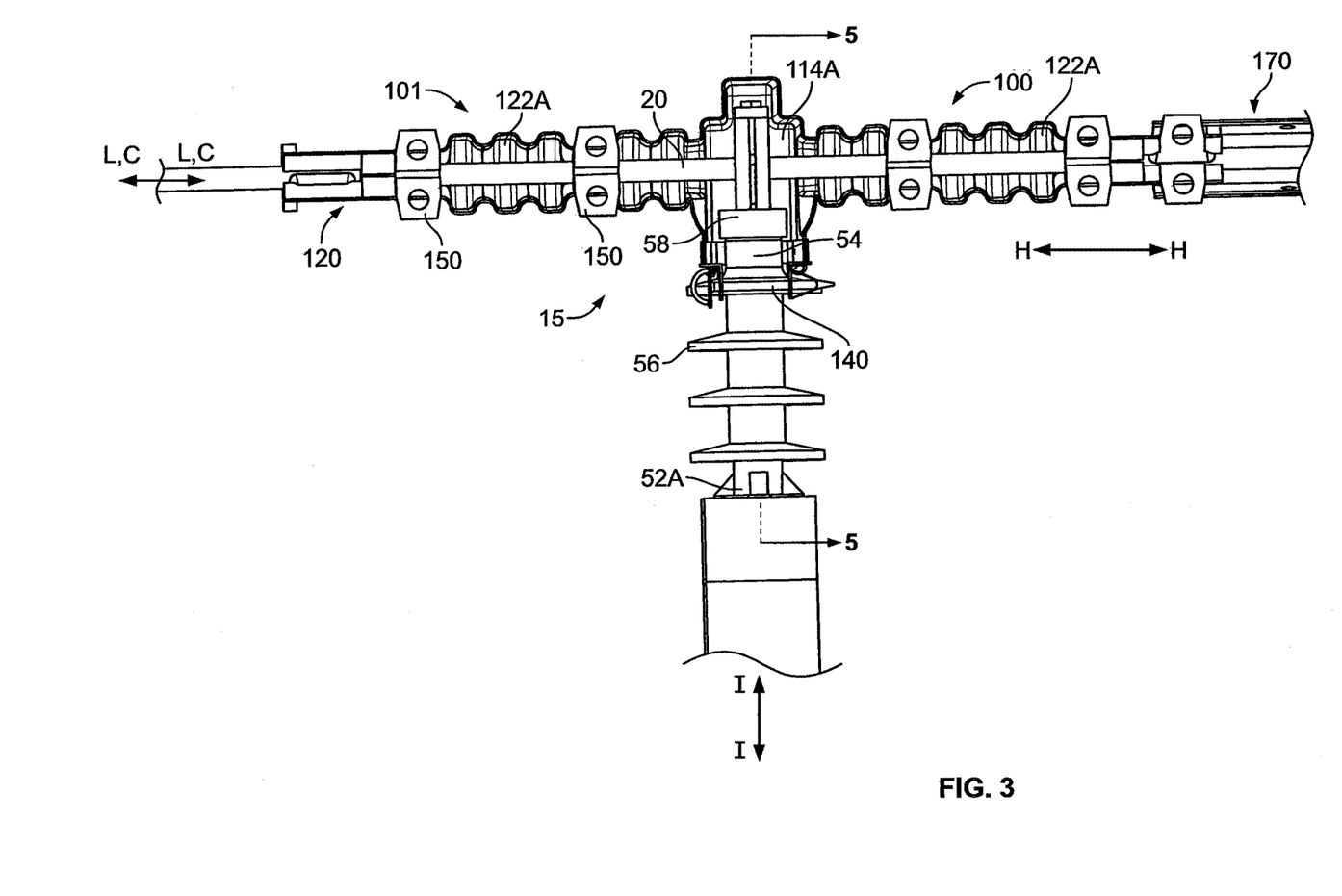
FIG. 3 is a fragmentary, bottom view of the electrical power distribution system of FIG. 1.
Figure 4:
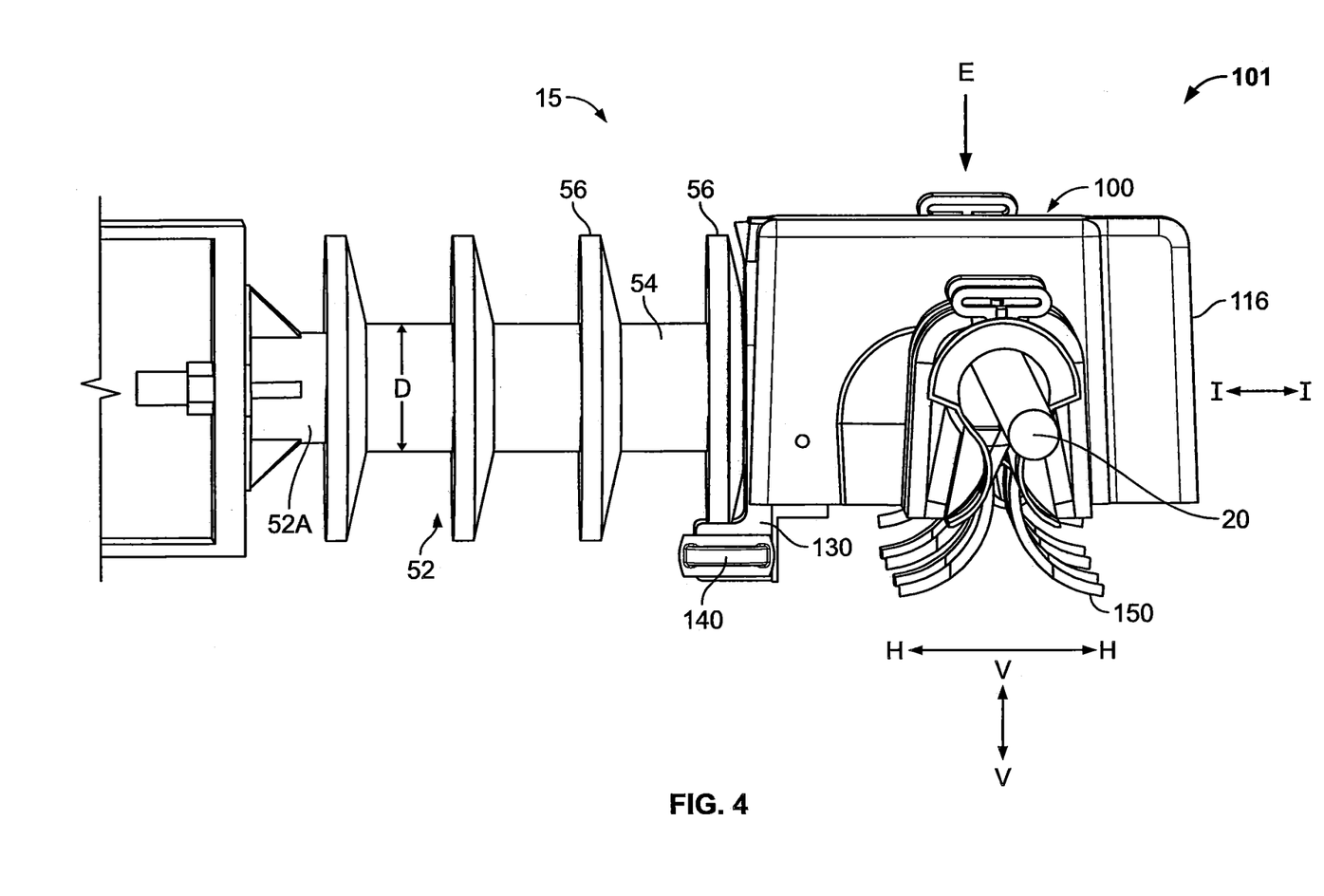
FIG. 4 is a fragmentary, side view of the electrical power distribution system of FIG. 1.
Figure 5:
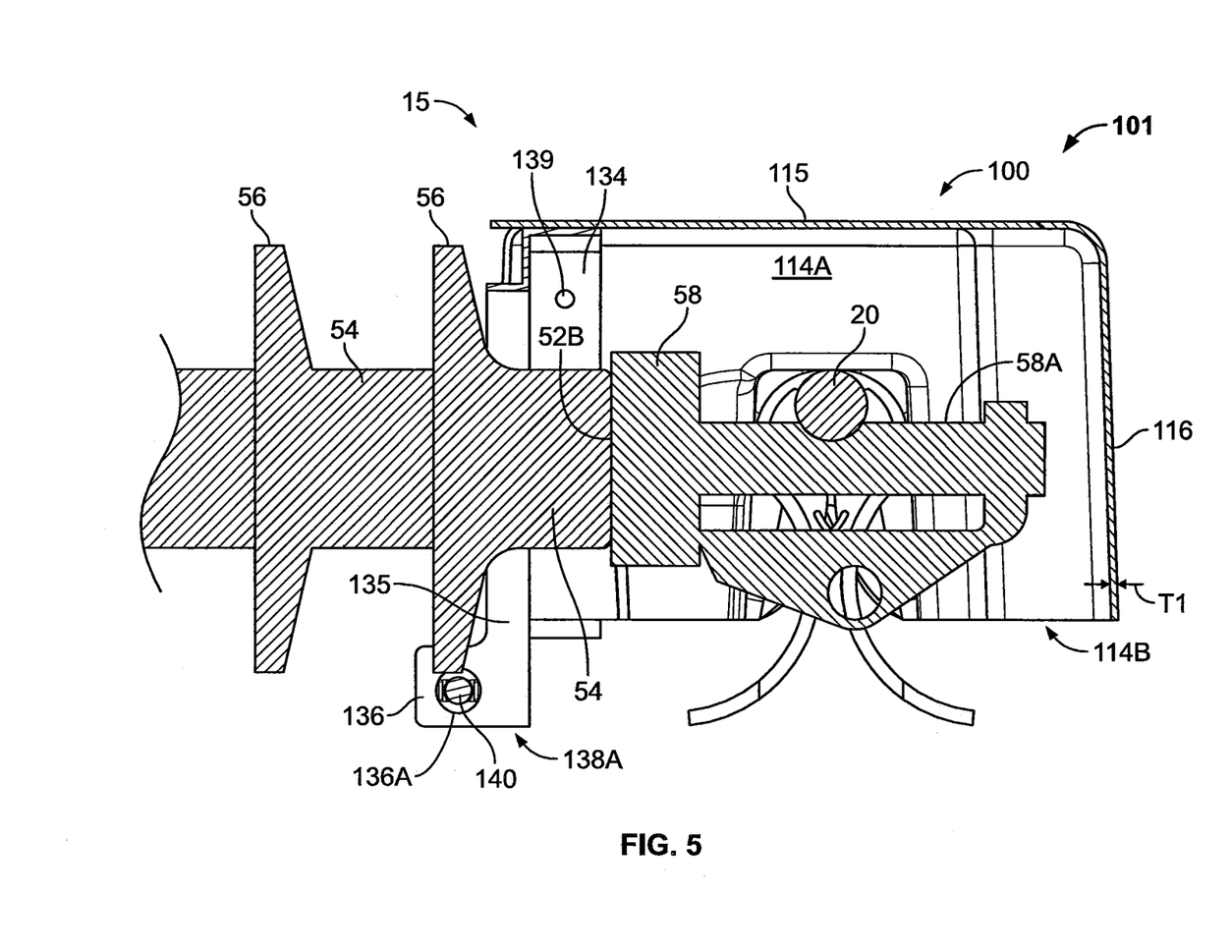
FIG. 5 is a fragmentary, cross-sectional view of the electrical power distribution system of FIG. 1 taken along the line 5-5 of FIG. 3.
Figure 6:
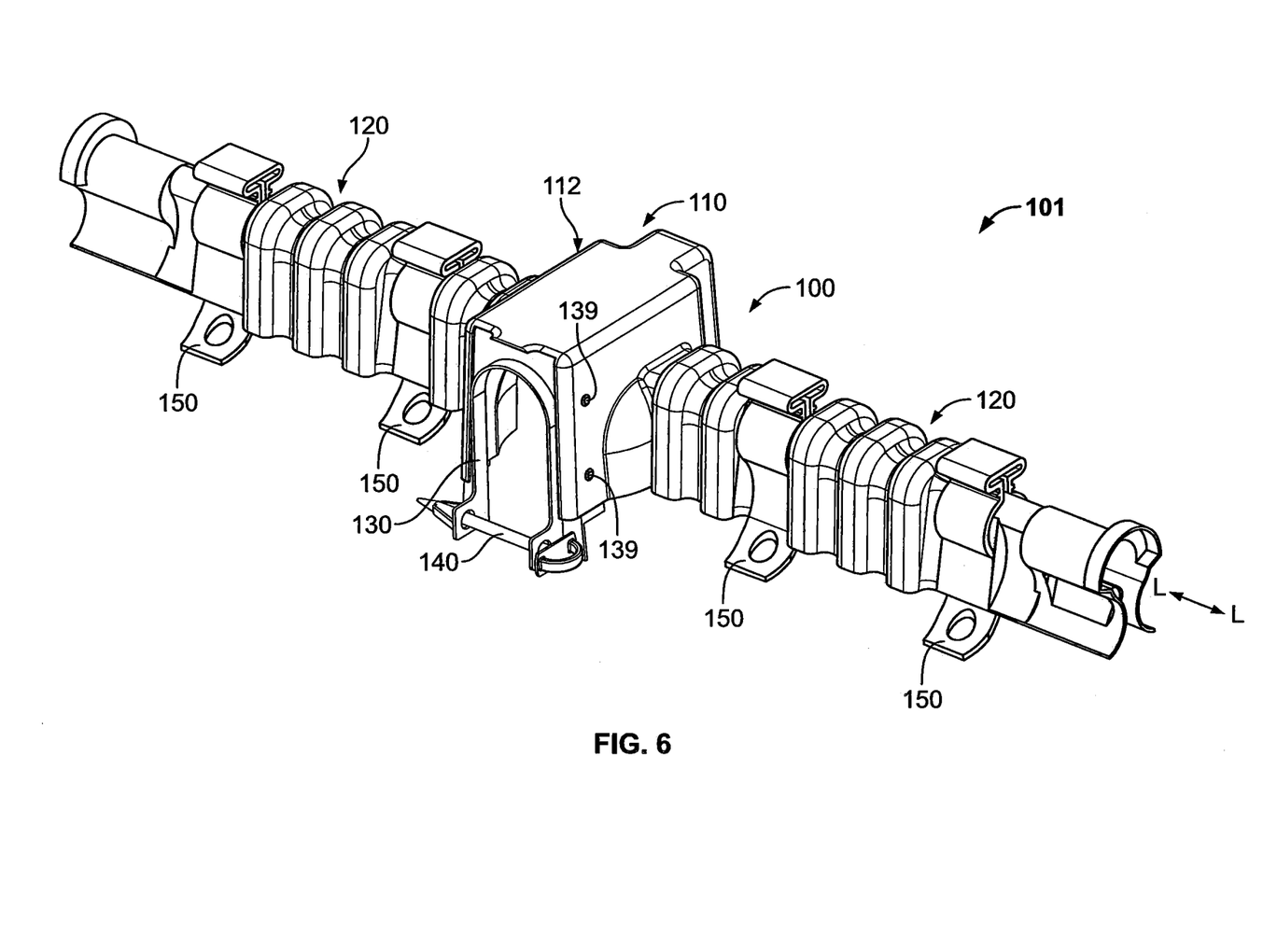
FIG. 6 is a top, rear perspective view of the protective cover assembly of FIG. 1.
Figure 7:
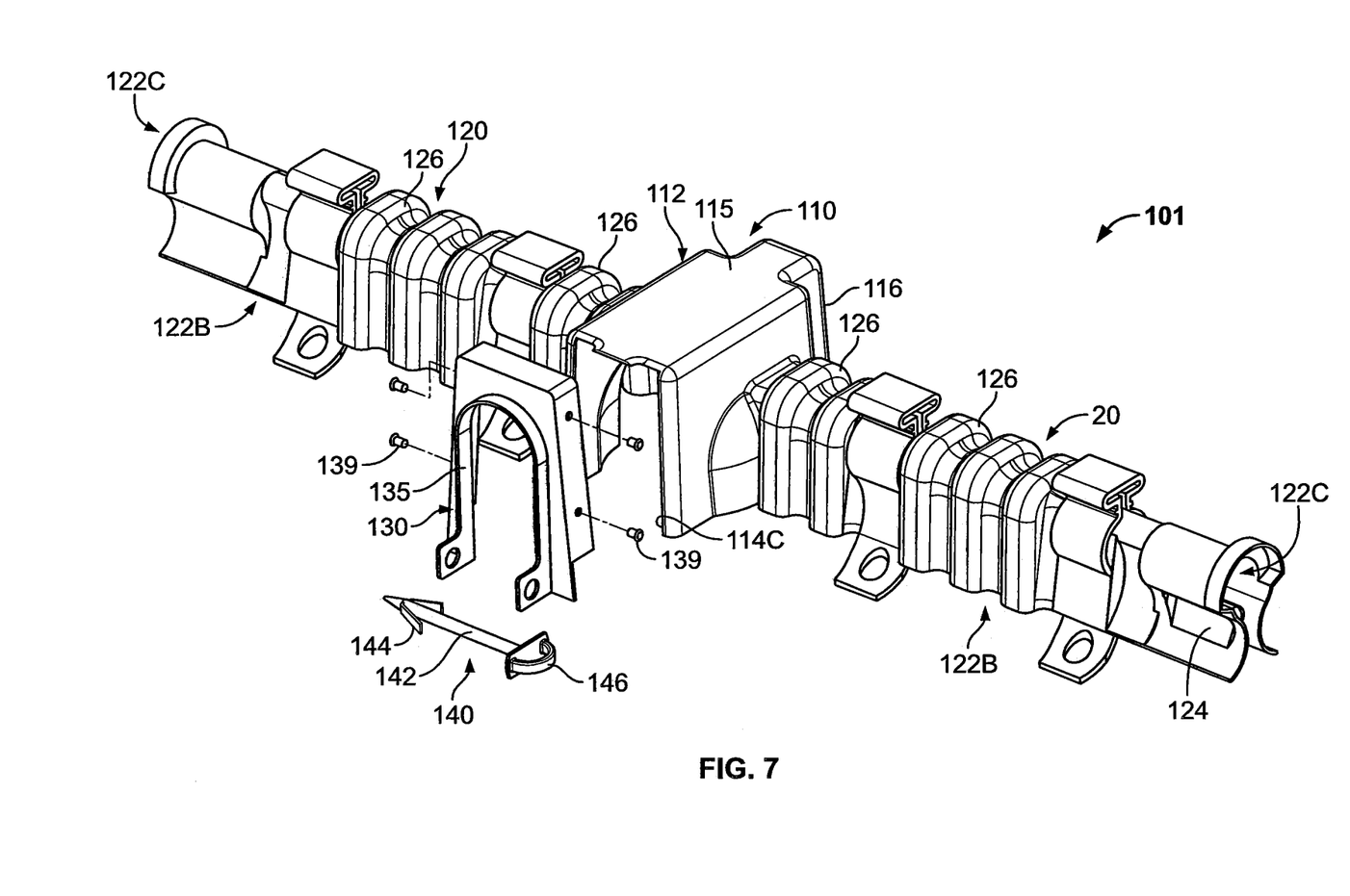
FIG. 7 is an exploded, top, rear perspective view of the protective cover assembly of FIG. 1.
Figure 8:
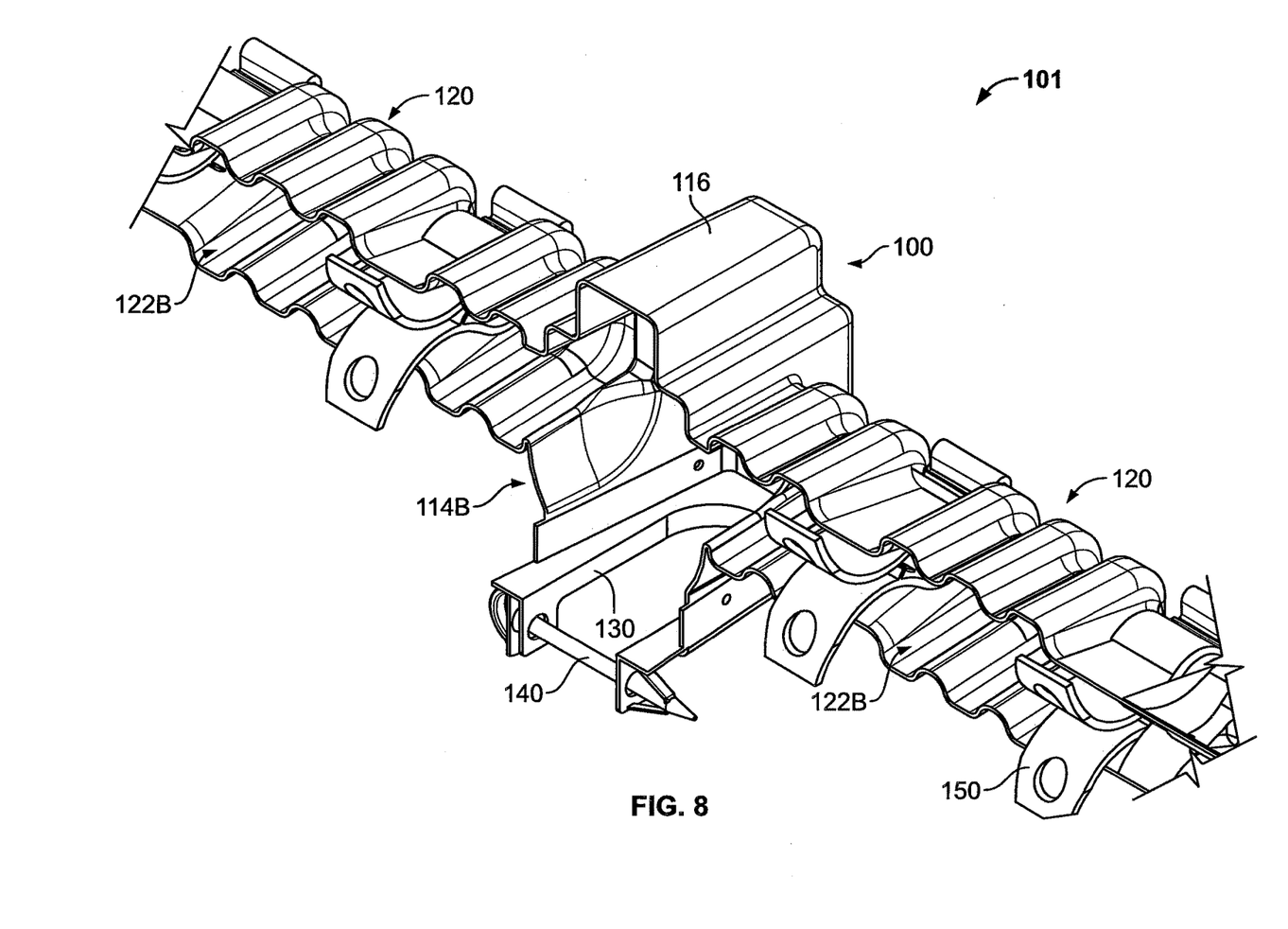
FIG. 8 is a bottom, front perspective view of the protective cover assembly of FIG. 1.
Figure 9:
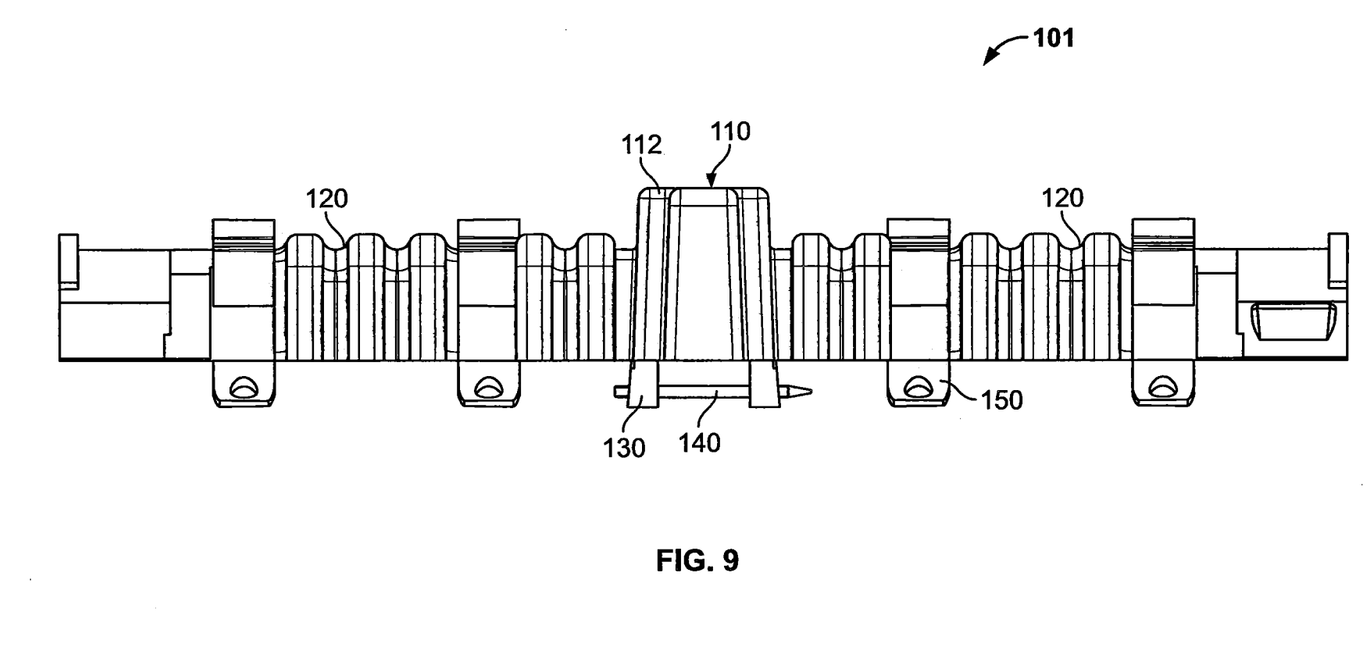
FIG. 9 is a front view of the protective cover assembly of FIG. 1.

The conductor 20 is first installed on the insulator 50 in conventional or other suitable manner as shown in FIG. 2.

The insulator cover 100 is then forced downwardly in a downward direction E (FIG. 4) onto the conductor 20 and the arrestor 50 such that the insulator 50 is received into the cavity 114A and portions of the conductor 20 are received into the channels 122A of the legs 120. As the conductor cover 100 is forced onto the conductor 20 in the downward direction E, the conductor 20 is received into the channel 122A through the bottom opening 122B. The installation direction E is transverse to, and in some embodiments perpendicular to, the longitudinal axis L-L and the heightwise axis H-H. As the conductor 20 moves into the channel 122A toward the connecting wall, the clips 150 elastically deflect outwardly and then recover or snap over to close about and capture the conductor 20 in the passages 156C. The clips 150 thereby resist, limit or prevent axial vertical displacement and removal of the cover 100 relative to and from the cover 30.

As the insulator cover 100 is lowered onto the insulator 50, the insulator 50 is received vertically through the lower opening 138A and into the rear inverted U-shaped slots 114C, 138. The body 132 and the rear flange 135 of the mounting bracket 130 are thereby inserted between the end fitting 58 and the first (i.e., most distal) insulator skirt 56.

The retaining pin 140 is then inserted through the holes 136A below the insulator body 52 to close the bottom entry opening 138A. The pin 140 is removably secured in place by the interlock between the head 144 and the tab 136. The retaining pin 140 may be installed using a hotstick or other tool, for example.

With the protective cover assembly 101 installed on the insulator 50 and conductor 20, the conductor 20 extends through and out from the legs 120. The bracket 58 is disposed in the cavity 114A. The top of the insulator body 52 and the bracket 58 are disposed in the cavity 114A. The mounting bracket 130 is disposed axially between the endmost skirt 56 and the proximal end of the bracket 58. The retaining pin 140 spans and positively closes off the bottom entry opening 138A of the slot 138 so that the insulator is fully encircled by the mounting bracket 130 and the retaining pin 140 (collectively). The cover 100 is thereby prevented from being removed radially or axially from the insulator 50. In other embodiments or installations, the mounting bracket 130 may be disposed axially between two adjacent skirts 56 (rather than between the endmost skirt 56 and the bracket 58).

The insulator 50 and the portion of the conductor 20 in the cover 100 and connected to the insulator 50 are thus protected, closed off, covered or shielded from above and from either lateral end. The cover 100 extends over the horizontal post insulator 50 from the endmost skirt 58 to the distal end of the bracket 58 that holds the conductor 20. Essentially all of the metal at the distal end of the insulator 50 is covered and protected by the cover 100 from above, the ends, and the sides. In this manner, the connection is protected from undesirable contact by wildlife.

If desired, an extension cover or covers 170 (FIGS. 1-3) can be installed on one or both of the legs 120 to extend the effective protection coverage. The extension cover 170 includes an elongate body 172, a pair of connector members or clips 176 corresponding to the clips 150. The body 172 defines an elongate, bottom opening channel 174 that is open on either end.

The extension cover 170 is forced onto the conductor 20 such that the distal (with respect to the cover 100) clip 176 captures the conductor 20, the proximal clip 176 captures the leg 120, and the conductor 20 is received in the channel 174. The proximal clip 176 is seated in the coupling recess 124 to resist, limit or prevent axial displacement of the extension cover 170 relative to the cover 100.

Removal of the cover 100 may be accomplished by removing the pin 140 from the tabs 136 and forcing the cover 100 off the insulator cover 30 and conductor 20 in the direction opposite the installation direction E using a hot stick 70 or other tool, for example, engaging one of the hot stick engagement features 157 of the clips 150. Similarly, removal of the covers 170 may be accomplished by forcing the covers 170 off the insulator 50 and conductor 20 in the direction opposite the installation direction E.

The cover 100 and system 10 can provide a number of advantages. The cover 100 protects the electrified portions of the connection from wildlife.

Covers according to embodiments of the invention (e.g., cover 100) can overcome the problem of needing multiple covers to protect numerous types of horizontal post insulators. The use of the rigid plate or bracket 130 with the inverted U-shaped opening or slot 138 in conjunction with the retaining pin 140 installed under the insulator 50 allows a given cover 100 to fit over both porcelain and polymeric horizontal post insulators of varying sizes. The mounting bracket 130 may fit any such insulator with a core diameter less than a prescribed diameter (in some embodiments, about 3.75 inches).

According to some embodiments, the cover 100 (including the mounting bracket 130) fits loosely on the insulator 50 and the retaining pin 140 keeps the cover 100 in place on the core 50 for any size insulator/core diameter in the prescribed range. According to some embodiments, the width W (FIG. 10) of the slot 138 is greater than the core diameter D (FIG. 4) for all insulator sizes in the prescribed range. According to some embodiments, the width W of the slot 138 is about 2.5 inches greater than the smallest core diameter D in the prescribed range and about 0.125 inch greater than the largest core diameter D in prescribed range.

As discussed above, in some embodiments, the mounting bracket 130 is made from a rigid material as contrasted with the flexible polymer material of the cover body 110. In some embodiments, the cover body 110 has a tensile strength of less than about 2000 psi and the mounting bracket 130 has a tensile strength greater than the cover body 110 and at least about 3000 psi.

By providing different rigidity materials for the cover body 110 and the mounting bracket 130, reliable holding strength and stability may be provided on the insulator while still providing a flexible configuration so as to adjust to various angles of approach of the lines to the insulator. The rigid mounting bracket 130 may provide a reliable coupling and support on the conductor 20 while the cover body 110 may be flexed to adjust to the angles.

The rearwardly projecting flange 135 can serve as a standoff or spacer to fill the axial gap between the fitting 58 and the first skirt 56 to prevent or limit translation and/or canting of the cover 100 relative to the insulator 50. The flange 135 may enhance the bend resistance of the mounting bracket 130.

As discussed above, in some embodiments, the clips 150 are made from a rigid material as contrasted with the flexible polymer material of the cover body 110. In some embodiments, the cover body 110 has a tensile strength of less than about 2000 psi and the clips 150 have a tensile strength greater than the cover body 110 and at least about 3000 psi.

By providing different rigidity materials for the cover body 110 and the connector members 150, reliable holding strength and stability may be provided on lines extending from the insulator while still providing a flexible configuration so as to adjust to various angles of approach of the lines to the insulator. The rigid connector members 150 may provide a reliable grip on the distribution lines while the cover body 110 may be flexed to adjust to the angles.

The cover 100 may be adapted for use with a prescribed range of insulator sizes. According to some embodiments, for any conductor within the prescribed range of sizes, the insertion force required to install the cover 100 on the insulator 50 and conductor as described above is in the range of from 5 to 25 lbs.

The cover 100 and extension cover 170 may be provided as a matched combination or kit.

Covers formed in accordance with the present invention may be used with insulators of different types, including, for example, insulators of surge arrestors.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A protective cover assembly for an electrical power distribution line conductor mounted on a horizontally oriented post insulator, the protective cover assembly comprising: an insulator cover including: a cover body defining an insulator cavity configured to receive the insulator; and a mounting bracket integral with the cover body, the mounting bracket defining a bracket slot having a bottom entry opening configured to receive the horizontally oriented insulator to couple the cover body to the insulator; and a retaining pin configured to span and positively close off the bottom entry opening of the bracket slot to secure the insulator cover to the insulator; wherein the cover body is formed of a flexible first material and the mounting bracket is formed of a second material that is more rigid than the first material.

2. The protective cover assembly of claim 1 wherein the mounting bracket is configured to fit loosely about the insulator when the protective cover assembly is installed on the insulator.

3. The protective cover assembly of claim 1 wherein the cover body and the mounting bracket are each formed of a polymeric material.

4. The protective cover assembly of claim 3 wherein:
first material of the cover body has a tensile strength of less than about 2000 psi; and
the second material of the mounting bracket has a tensile strength of at least about 3000 psi.

5. The protective cover assembly of claim 3 wherein: the first material of the cover body has a secant modulus in the range of from about 10,000 to 25,000 psi; and the second material of the mounting bracket has a secant modulus in the range of from about 29,000 to 120,000 psi.

6. The protective cover assembly of claim 1 wherein the mounting bracket is affixed to the cover body by fasteners.

7. The protective cover assembly of claim 1 wherein the mounting bracket includes a pair of laterally spaced apart lock tabs each including a hole to receive the retaining pin.

8. The protective cover assembly of claim 1 wherein the mounting bracket is inverted U-shaped.

9. The protective cover assembly of claim 1 wherein the mounting bracket includes:
a bracket body attached to the cover body; and
a reinforcement flange projecting axially from the bracket body.

10. The protective cover assembly of claim 9 wherein the reinforcement flange is inverted U-shaped.

11. The protective cover assembly of claim 1 including a plurality of integral connector members to secure the cover body to the conductor when the protective cover assembly is installed on the insulator, wherein the connector members are formed of a more rigid material than the first material of the cover body.

12. The protective cover assembly of claim 11 wherein the connector members are resilient clips.

13. The protective cover assembly of claim 1 wherein the cover body defines:
a bottom opening contiguous with the insulator cavity;
a front wall; and
a bottom opening rear end slot contiguous with the insulator cavity and located opposite the front wall, the rear end slot being configured to receive the horizontally oriented insulator.

14. The protective cover assembly of claim 13 wherein the mounting bracket is affixed to the cover body adjacent the rear end slot.

15. The protective cover assembly of claim 13 wherein the cover body includes:
a shroud section including the insulator cavity; and
a pair of integral legs extending laterally from the shroud section in opposing directions, the legs each defining a bottom opening channel communicating with the insulator cavity and configured to receive a section of the conductor when the protective cover assembly is installed on the insulator.

16. The protective cover assembly of claim 15 wherein the legs include flexible corrugated joint sections.

17. The protective cover assembly of claim 1 wherein the mounting bracket is separately formed from the cover body and is affixed to the cover body.

18. A method for forming an environmentally protected insulator assembly including an electrical power distribution line conductor mounted on a horizontally oriented post insulator, the method comprising: providing an insulator cover comprising: a cover body defining an insulator cavity configured to receive the insulator; and a mounting bracket integral with the cover body, the mounting bracket defining a bracket slot having a bottom entry opening configured to receive the horizontally oriented insulator to couple the cover body to the insulator; and mounting the insulator cover on the conductor and the horizontally oriented insulator such that the insulator is received in the insulator cavity and into the bracket slot through the bottom entry opening; and installing a retaining pin in the mounting bracket to span and positively close off the bottom entry opening of the bracket slot to secure the insulator cover to the insulator; wherein the cover body is formed of a flexible first material and the mounting bracket is formed of a second material that is more rigid than the first material.

19. The method of claim 18 wherein, following the step of installing the retaining pin in the mounting bracket, the retaining pin and the mounting bracket collectively fully encircle the insulator.

20. An environmentally protected insulator assembly comprising: a horizontally oriented post insulator; an electrical power distribution line conductor mounted on the horizontally oriented post insulator; an insulator cover comprising: a cover body defining an insulator cavity configured to receive the insulator; and a mounting bracket integral with the cover body, the mounting bracket defining a bracket slot having a bottom entry opening configured to receive the horizontally oriented insulator; wherein the insulator cover is mounted on the conductor and the horizontally oriented insulator such that the insulator is received in the insulator cavity and the bracket slot; and a retaining pin installed in the mounting bracket to span and positively close off the bottom entry opening of the bracket slot to secure the insulator cover to the insulator; wherein the cover body is formed of a flexible first material and the mounting bracket is formed of a second material that is more rigid than the first material.

21. The environmentally protected insulator assembly of claim 20 wherein the retaining pin and the mounting bracket collectively fully encircle the insulator.

\* \* \* \* \*